(12) United States Patent
Jen

(10) Patent No.: US 6,510,758 B2
(45) Date of Patent: Jan. 28, 2003

(54) SPEED CONTROLLER OF A BICYCLE

(75) Inventor: Chen Shu Jen, Hsinchuang (TW)

(73) Assignee: Mei Lin Tai-Yen Industrial Co. Ltd., Taipei Shien (TW)

(*) Notice: Subject to any disclaimer, the term of this patent is extended or adjusted under 35 U.S.C. 154(b) by 0 days.

(21) Appl. No.: 09/809,752

(22) Filed: Mar. 14, 2001

(65) Prior Publication Data

US 2002/0129674 A1 Sep. 19, 2002

(51) Int. Cl.⁷ .............................................. B62K 23/04
(52) U.S. Cl. ........................................ 74/502.2; 74/489
(58) Field of Search ........................ 74/489, 502.2, 74/506

(56) References Cited

U.S. PATENT DOCUMENTS 5,241,877 A * 9/1993 Chen ............................ 74/489
5,823,058 A * 10/1998 Arbeiter ........................ 74/489

* cited by examiner

Primary Examiner—Christopher P. Schwartz
(74) Attorney, Agent, or Firm—Pro-Techtor International Services

(57) ABSTRACT

A speed controller has a body, a collar interference fit in the through hole of the body, a rotation element having an arcuate extension formed to correspond to an arcuate passage and provided with multiple notches, a sleeve formed to mate with an elongated extension and an elongated protrusion. A user rotates the sleeve to drive the rotation element to accomplish the speed change. Friction between the body and the cable is reduced by removing the lining of the body, so that the force required to operate the speed controller is greatly reduced.

1 Claim, 5 Drawing Sheets

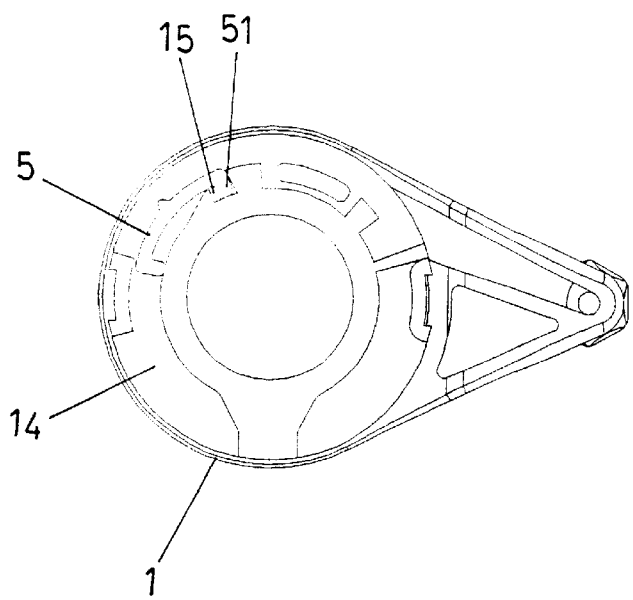
FIG.4
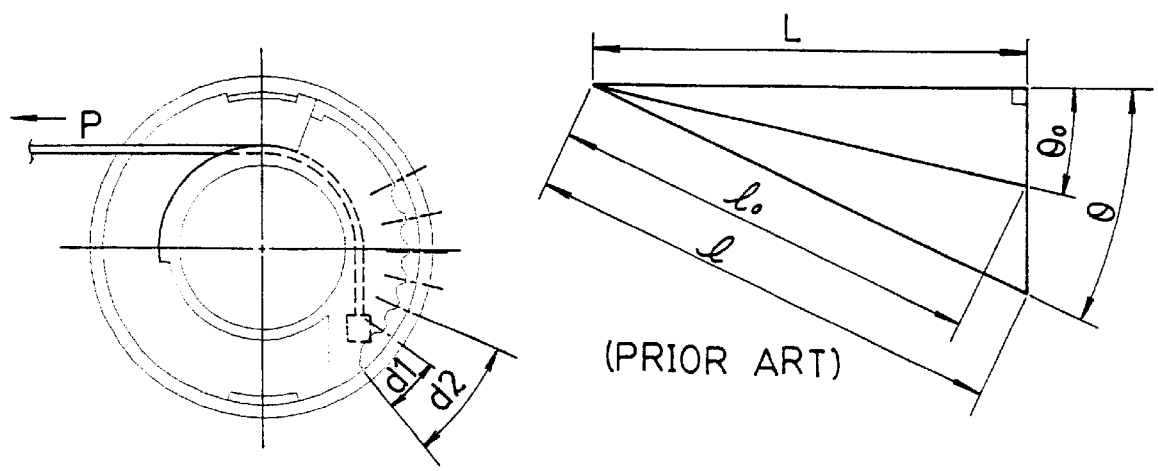
FIG.5
FIG.6
(PRIOR ART)

SPEED CONTROLLER OF A BICYCLE

BACKGROUND OF THE INVENTION

1. Field of the Invention

The present invention relates to a speed controller, and more particularly to a speed controller of a bicycle. The speed controller has a body, a rotation element, a sleeve, a collar and a position element. The body and the rotation element are combined into one piece to eliminate the friction of the cable so as to provide a stable speed change.

2. Description of Related Art

A conventional speed controller uses a handlebar with length L to drive a cable with length $I_0$, as shown in FIG. 6. The length of the cable is changed to I such that the length change of the cable becomes $I_0-I$. With reference to FIG. 6, $I_0-I=L/\cos\theta-L/\cos\theta_0=L(1/\cos\theta-1/\cos\theta_0)$. The purpose is to increase the rotation angle of the speed controller. However, it has its drawbacks, such as:

When the cable is driven, because the head tube is firmly fixed, a great deal of friction exists between the cable and the head tube, which causes the speed controller to be difficult to rotate.

With reference to FIG. 7, it is noted that a handlebar c extends through a conventional rotation element a and a body b. When the cable d is driven, the length change of the cable is fixed, which restricts the rotation angle of the rotation element so that it is not sufficient to efficiently accomplish the speed change. This speed controller has the following drawbacks:

1. The rotation angle of the position element e is not large enough so that friction reduces the life span of the position element.
2. To overcome the friction, the user will have to apply a large force, which makes the operation of the position element difficult.

To overcome the shortcomings of the prior art, the present invention provides an improved retaining device to mitigate or obviate the aforementioned problems.

SUMMARY OF THE INVENTION

The primary objective of the invention is to provide an improved speed controller which removes the lining of the body to reduce friction between the cable and the body.

Another objective of the invention is to provide a position element with a centrally formed protrusion to fix the relative movement between the position element and the rotation element, such that the speed change is much more accurate than with a conventional controller.

Other objects, advantages and novel features of the invention will become more apparent from the following detailed description taken in conjunction with the accompanying drawings.

BRIEF DESCRIPTION OF THE DRAWINGS

FIG. 4 is a side plan view showing the engagement between the body and the position element;

FIG. 5 is a side plan view of the rotation element together with the cable;

FIG. 6 is a schematic view showing the length change of a conventional cable and the handlebar.

DETAILED DESCRIPTION OF PREFERRED EMBODIMENT

Figure 1:
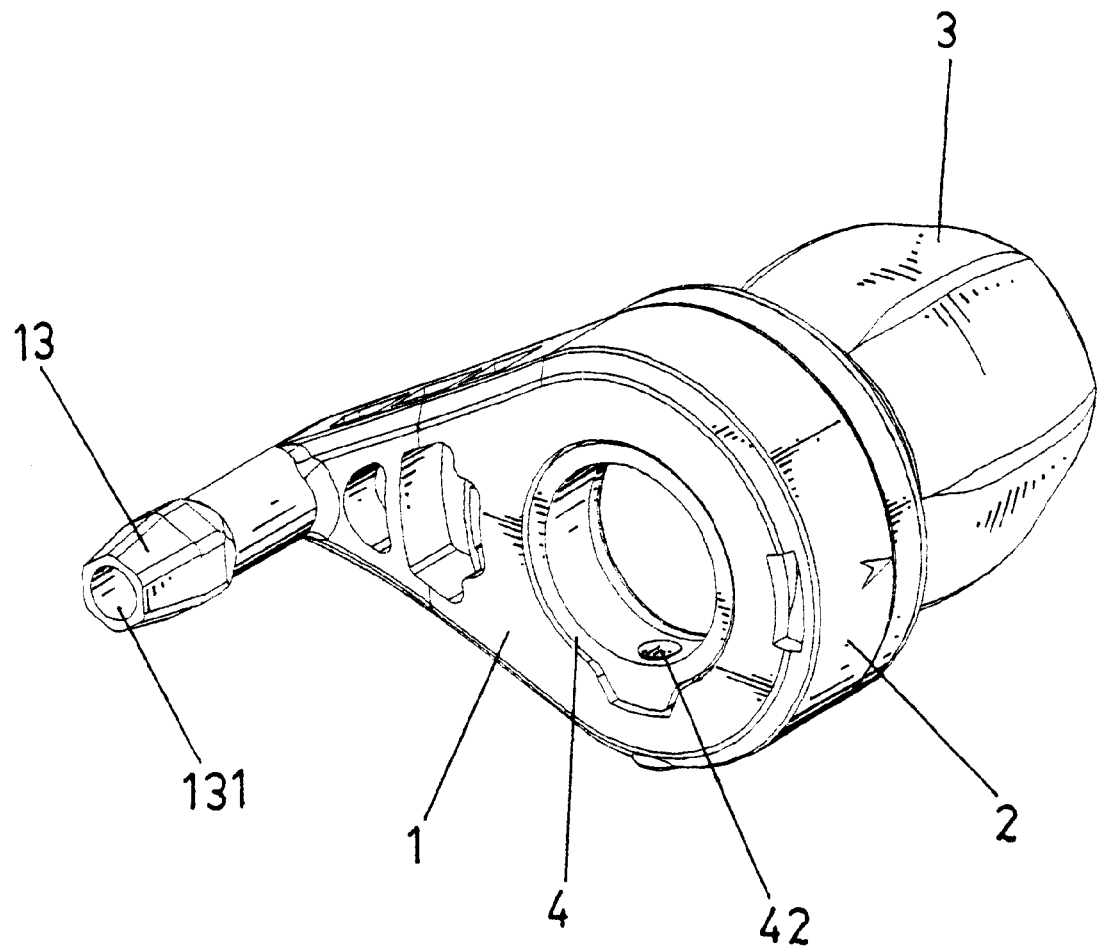
FIG. 1 is a perspective view of the speed controller in accordance with the present invention.
Figure 2:
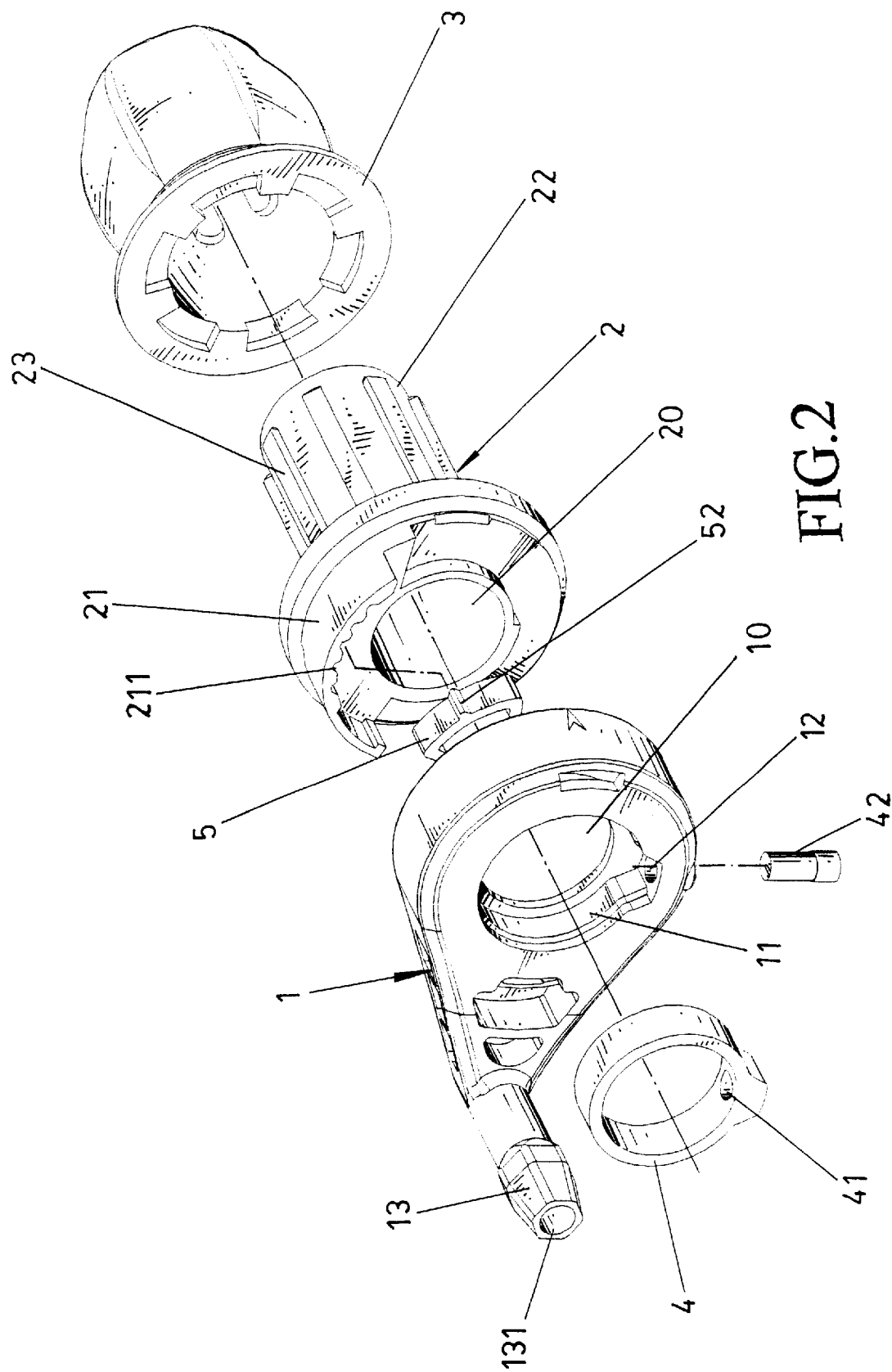
FIG. 2 is an exploded perspective view of the speed controller of the present invention.
Figure 3:
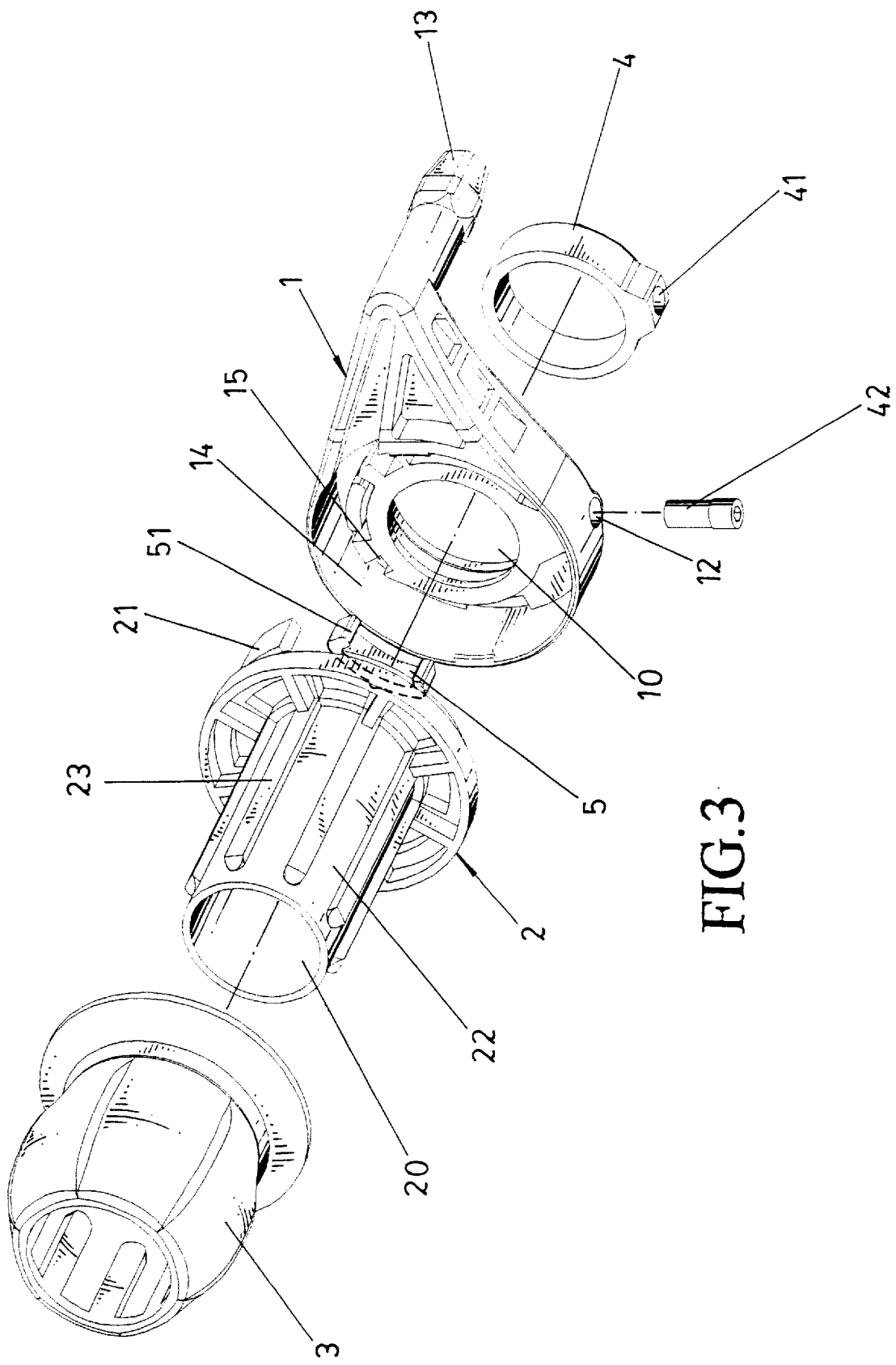
FIG. 3 is an opposite end exploded perspective view of the speed controller.
Figure 7:
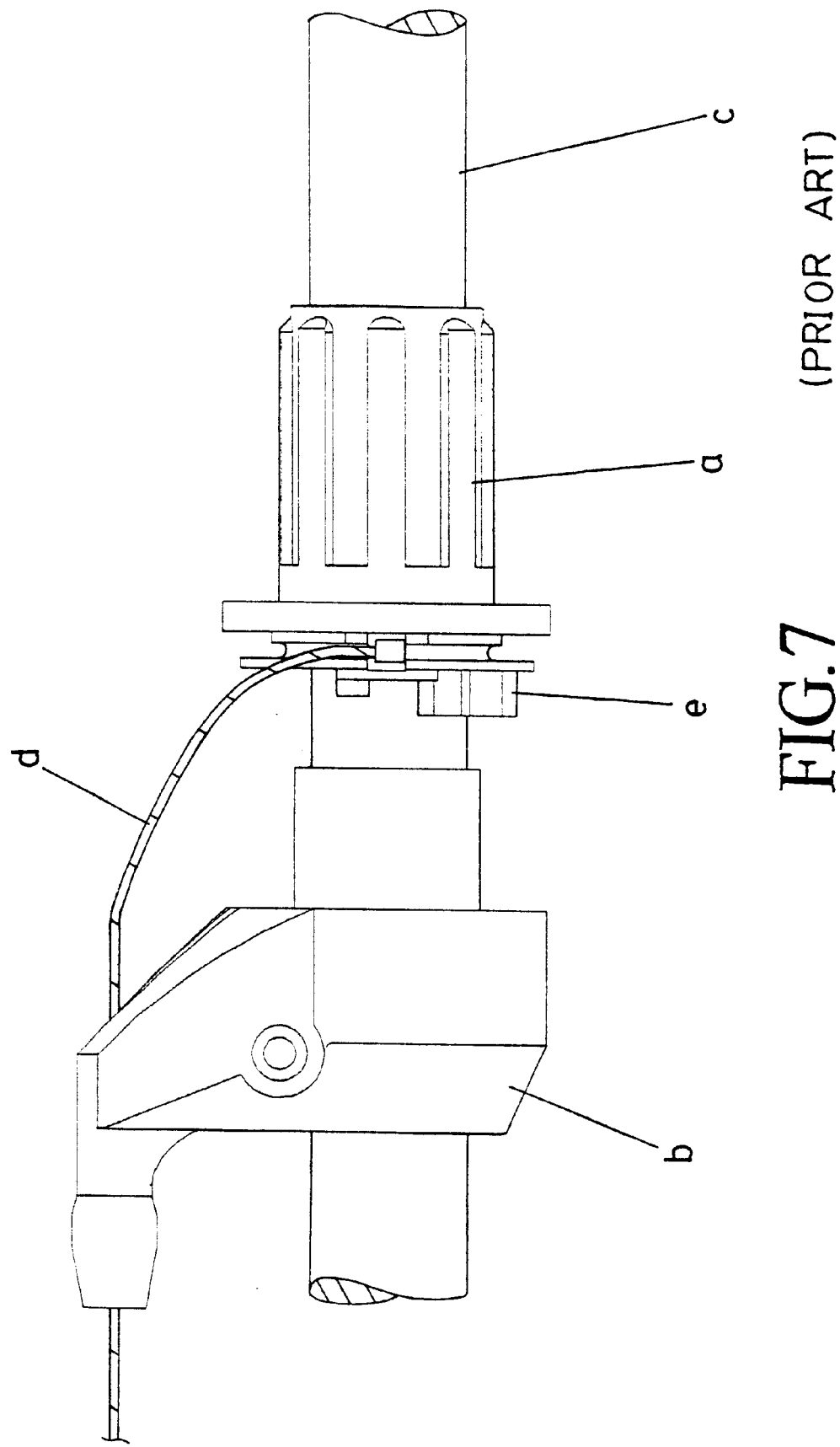
FIG. 7 is a side plan view of a conventional speed controller.

With reference first to FIGS. 1–3, a speed controller in accordance with the present invention has a body 1, a rotation element 2, a sleeve 3, a collar 4 and a position element 5.

The body 1 has a centrally defined through hole 10, with an annular groove 11 defined in an inner face of the through hole 10. A first pin hole 12 passes through the body 1. A control lever 13 extends outward from an end of the body 1, and has a hole 131 defined in an end to allow a cable to extend therethrough.

The collar 4 is interference fit in the through hole 10 and received in the groove 11. The collar 4 has a second pin hole 41 corresponding in position to the first pin hole 12 so that after the collar 4 is received in the groove 11, a pin 42 passes through the second pin hole 41 and into the first pin hole 12 to secure the engagement between the collar 4 and the body 1.

The rotation element 2 has a central hole 20, an arcuate extension 21 formed to correspond in location to an arcuate passage 14 in the body 1, and is provided with multiple notches 211, as shown in FIG. 3. The rotation element 2 also has an elongated extension 22 integrally formed on a side and multiple elongated protrusions 23 formed on a face of the elongated extension 22.

The sleeve 3 is formed to mate with the elongated extension 22 and the elongated protrusions 23 so that a user is able to rotate the sleeve 3 to drive the rotation element 2 to accomplish the speed change.

It is to be noted that when the rotation element 2 is combined with the body 1, because the lining of the body 1 is removed, a large amount of friction of the cable with the lining of the body 1 is eliminated. Furthermore, due to the reduction of the friction of the cable, the rotation element 2 has a larger rotation angle (10% increase) when compared with a conventional one.

With reference to FIG. 5, the principle of the advantage of the invention is shown as follows:

Wherein $r_1$, $r_2$ are the radii of the cable around the rotation element;

$d_1$, $d_2$ are the operation angles;

S is the distance of the speed controller driven by the cable;

$S = r_1\theta_1 = r_2\theta_2$ $\theta_1/\theta_2 = r_2/r_1 = 1.1$ which shows that the rotation angle is increased by 10%

T (torque) = pr $T_1 = pr_1$; $T_2 = pr_2$ $T_1/r_1 = T_2/r_2$; $T_1/T_2 = r_1/r_2 = 0.9$ which shows that the force required is reduced by 10%

With reference to FIGS. 2–4, it is to be noted that the arcuate passage 14 has a recess 15 defined therein to correspond to protruding feet 51 of the position element 5. The position element 5 has two feet 52 formed on opposite sides of the position element 5 and received in two adjacent notches 211 so that the rotation element 2 can only rotate in one direction, which provides stability to the speed controller of the invention when in use.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

What is claimed is:

1. A speed controller of a bicycle, said speed controller comprising:

a body having a centrally defined through hole, an annular groove defined in a face of said through hole, a first pin hole defined in a face of said groove and a control lever extending out from an end of said body and having a hole defined in an end thereof so as to receive a cable;

a collar interference fit in said through hole and received in said groove and having a second pin hole defined to correspond to said first pin hole so that after said collar is received in said groove, a pin extends through said second pin hole and into said first pin hole to secure an engagement between said collar and said body;

a rotation element having a central hole, an arcuate extension formed to correspond to an arcuate passage defined in said body and provided with multiple notches, and an elongated extension integrally formed on a side of said rotation element and provided with multiple elongated protrusions formed on a face of said elongated extension;

a sleeve formed to mate with said elongated extension and said elongated protrusion so that a rotation of said sleeve drives said rotation element; and a position element having two feet each formed on opposite ends thereof that are received in two adjacent notches of said rotation element, and a central protrusion formed to correspond to a recess defined in a face defining said arcuate passage.

* * * * *